(12) United States Patent
Hunter

(10) Patent No.: US 7,325,783 B2  
(45) Date of Patent: Feb. 5, 2008

(54) VALVE SEAT EDGE RELIEF PROFILE

(75) Inventor: Rick C. Hunter, Friendswood, TX (US)

(73) Assignee: Vetco Gray Inc., Houston, TX (US)

( * ) Notice: Subject to any disclaimer, the term of this patent is extended or adjusted under 35 U.S.C. 154(b) by 0 days.

(21) Appl. No.: 11/120,070

(22) Filed: May 2, 2005

(65) Prior Publication Data

US 2006/0243941 A1 Nov. 2, 2006

(51) Int. Cl.  
*F16K 25/00* (2006.01)

(52) U.S. Cl. .................. 251/195; 251/314; 251/328; 251/334; 251/363

(58) Field of Classification Search ............ 251/175, 251/180, 195, 328, 314, 334, 363  
See application file for complete search history.

(56) References Cited

U.S. PATENT DOCUMENTS

| | | | |
|---|---|---|---|
| 3,083,945 A * | 4/1963 | Shafer et al. ............. 251/363 |
| 4,377,273 A | 3/1983 | Beson | |
| 4,645,179 A * | 2/1987 | Ali ....................... 251/327 |
| 4,911,407 A * | 3/1990 | Paul, Jr. ................. 251/172 |
| 5,170,989 A * | 12/1992 | Kemp .................... 251/174 |
| 5,346,179 A | 9/1994 | Lochmann | |
| 5,762,320 A | 6/1998 | Williams et al. | |
| 6,454,015 B1 | 9/2002 | Armstrong et al. | |

FOREIGN PATENT DOCUMENTS

| GB | 2293433 A | 3/1996 |
|---|---|---|
| GB | 2316465 A | 2/1998 |

* cited by examiner

*Primary Examiner*—Gregory Huson  
*Assistant Examiner*—John K. Fristoe, Jr.  
(74) *Attorney, Agent, or Firm*—Bracewell & Giuliani LLP

(57) ABSTRACT

A valve seat has an outer surface, a rearward end, a face and a forward end. A passage extends from the rearward end to the face. A valve element slidingly contacts the face. Stress relief flanges are located on the face in areas of high bearing stress. Each flange has a thickness that allows it to deflect slightly to reduce bearing stresses.

15 Claims, 3 Drawing Sheets

VALVE SEAT EDGE RELIEF PROFILE

FIELD OF THE INVENTION

This invention relates in general to gate and ball valve seats, and in particular to a profile formed on the seat for relieving bearing stress.

BACKGROUND OF THE INVENTION

A gate valve has a body with a central cavity that is intersected by two coaxial passages. Seat rings are located at the intersections of each passage with the cavity. Each seat ring has a face that is engaged by a gate that moves between an open and a closed position. In some cases, these gate valves are subject to high bearing loads due to high pressure forcing the gate against the seat ring. Moving the gate under high loads may lead to galling or marring the surface finish of the gate-seat interface. Galling increases the friction between the gate and seat ring and reduces the sealability. Premature failure may result.

A ball valve also utilizes a seat ring with a face that slidingly engages a sealing element, which in this case is a ball element. The face of the seat ring tends to gall at its inner edge.

All materials in normal bearing contact will experience failure or damage to the surface finishes if loaded to a high enough level when subject to dynamic motion. A ball or gate valve must be able to cycle while maintaining a certain leak tightness. It is therefore advantageous to have valve components that experience dynamic contact during operation that are resistant to surface damage.

It is also well established that lubricants, such as grease, have diminished capacity to provide lubrication as the bearing stress becomes extreme. This is because the surface tension and viscosity of the fluid are unable to support the high loads resulting in surface contact and subsequent surface damage. This effect is amplified at high valve operating temperatures, where the lubricant's viscosity and surface tension are reduced.

SUMMARY OF THE INVENTION

In the design of a gate valve, it has been generally assumed that a force acting over a planar surface will experience a bearing stress that is uniform over that surface. In this invention, this has been determined to be incorrect. Modeling has indicated that the stress level at the inner and outer diameters of a seat ring increase over the uniform bearing stress. The bearing stress at the edges can in fact be many times higher than the average bearing stress calculation would indicate.

The present invention significantly improves this non-uniform bearing stress distribution by reducing the axial stiffness of the valve seat in the areas of highest bearing stress, which is at the inner and outer edges of the seat face. This reduction in axial stiffness is accomplished by creating a semi-flexible flange at these edges. Hence under load, the flanges flex. Thereby creating a bearing stress profile across the seat face that is much more uniform.

The valve seat of this invention comprises a tubular member having an exterior surface, a rearward end, a face, a forward end and a passage extending from the rearward end to the face. A radially extending annular inner diameter flange is located at the inner diameter of the face. The flange has a forward side that defines an inner periphery of the passage. The flange has a rearward side that faces in the rearward direction. The flange flexes slightly under load to reduce contact stress at the inner periphery of the face.

The seat ring may be either a gate valve type or a ball valve type. Preferably, the gate valve seat ring has an annular flange on the outer periphery of the face as well.

DETAILED DESCRIPTION OF THE INVENTION

Figure 1:
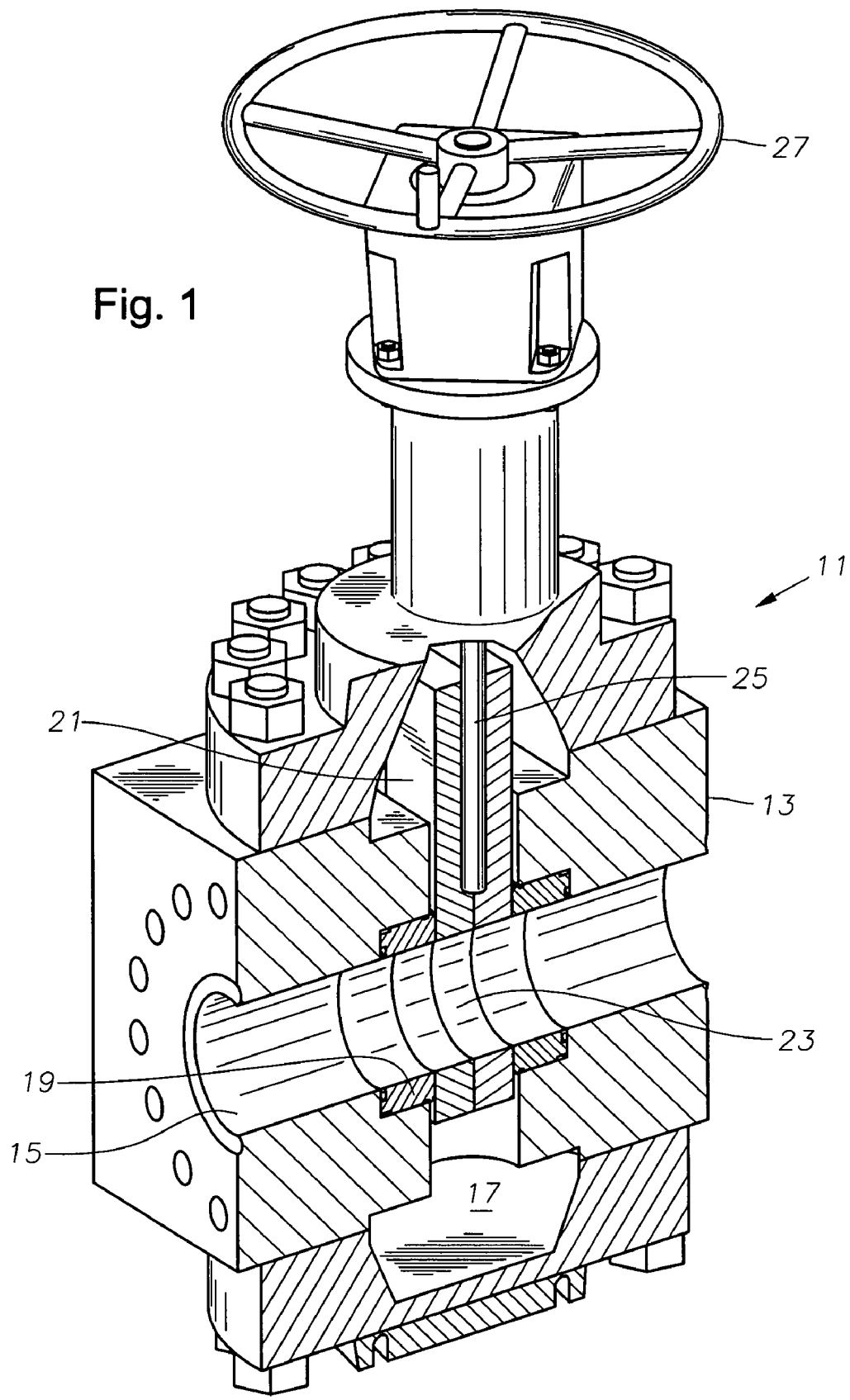
FIG. 1 is an isometric view, partially broken away, of a gate valve having seat rings constructed in accordance with this invention.

Referring to FIG. 1, gate valve 11 has a body 13. Body 13 has two co-axial passages 15 (only one shown) that extend to a central cavity 17 from opposite sides of body 13. Passages 15 connect to a flowline or other mating equipment (not shown). A seat ring 19 (only one shown) is mounted in each passage 15. Each seat ring 19 locates at the junction of one of the passages 15 with cavity 17 and protrudes into cavity 17.

A gate member 21 moves within cavity 17 between an open position, which is shown, and a closed position. Gate 21 may be a split slab or may be a single slab as shown. Gate 21 has a hole 23 through it that registers with passages 15 when in the open position. A stem 25 causes gate 21 to move between the open and closed positions. Stem 25 may be either a non-rising type or a type that moves along its axis when rotated. Gate 21 may be actuated hydraulically, electrically, or by a hand wheel 27, as shown.

Figure 2:
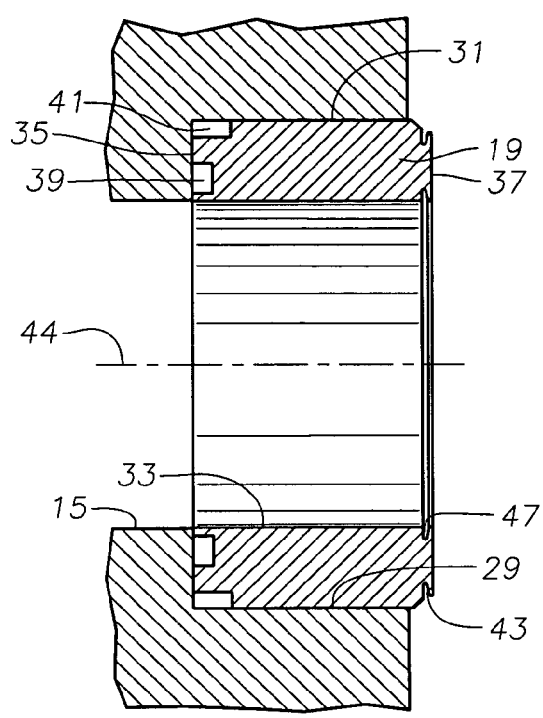
FIG. 2 is an enlarged sectional view of one of the seat rings of the gate valve of FIG. 1.

Referring to FIG. 2, seat ring 19 is located within a counterbore 29 located at the intersection of one of the passages 15 with body cavity 17. Seat ring 19 is a tubular member having an outer diameter surface 31 that fits closely in counterbore 29 and an inner diameter 33. Inner diameter 33 has effectively the same diameter as passage 15. Seat ring 19 has a rearward end 35 located at the base of counterbore 29. A face 37 is formed on a forward end for sliding engagement by gate 21 (FIG. 1). Face 37 protrudes slightly past the side wall of cavity 17. In this embodiment, face 37 has an inner diameter that is the essentially the same as inner diameter 33. The outer diameter of face 37 is smaller in this embodiment than the diameter of outer diameter surface 31.

Seat ring 19 may be installed in a variety of manners within counterbore 29. In this embodiment, a spring element (not shown) locates within an annular cavity 39 on rearward end 35. The spring is compressed between the base of counterbore 29 and seat ring 19 for biasing seat ring 19 toward cavity 17. A conventional seal (not shown) locates within an annular seal cavity 41 on outer diameter surface 31 for sealing against the side wall of counterbore 29. Although seat ring 19 is biased for movement along its axis 44, the invention is also applicable to seat rings that are rigidly mounted in a counterbore.

Figure 3:
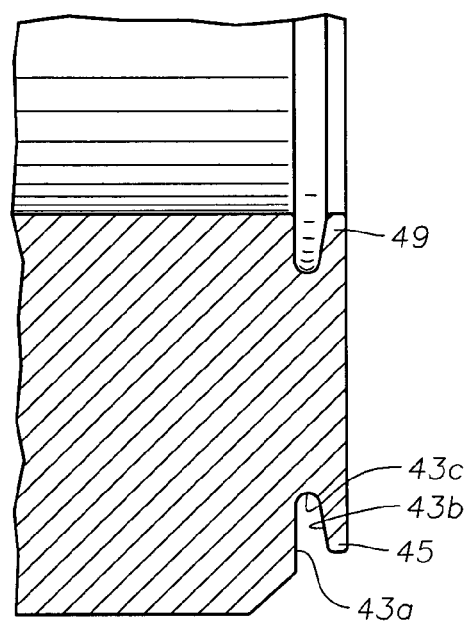
FIG. 3 is a further enlarged sectional view of a portion of the seat ring of FIG. 2.

Referring to FIG. 3, an annular groove 43 is located in outer surface 31 near the junction with face 37. Groove 43 is located in a portion of seat ring 19 that protrudes into cavity 17, thus is located forward of counterbore 29. Groove 43 has a rearward sidewall 43a, a forward sidewall 43b and a base 43c that is arcuate. In this embodiment, forward sidewall 43b extends outward at an inclination relative to axis 44 (FIG. 2), thus it is conical. However, forward sidewall 43b could be in a plane perpendicular to axis 44. In this embodiment, rearward sidewall 43a is in a plane perpendicular to axis 44, however it could be inclined. The axial distance between forward and rearward side walls 43b, 43a may vary widely.

Groove 43 defines an annular outer diameter flange 45 located at the outer periphery of face 37. The rearward side of flange 45 comprises the forward side 43b of groove 43. The forward side of flange 45 is perpendicular to axis 44 (FIG. 2) and comprises an outer peripheral portion of face 37. In this embodiment, because of the inclination of groove forward sidewall 43b, flange 45 tapers in thickness from base 43c to its free edge at the outer diameter of flange 45. The thickness of flange 45 measured between base 43c and face 37 is greater than the thickness of flange 45 at its free edge. Also, in this embodiment, the thickness of flange 45, measured at groove base 43c, is less than a radial depth of groove 43. In this embodiment, the outer diameter of flange 45 at its free edge is less than outer diameter of seat ring outer diameter surface 31 where it locates within counterbore 29.

In one example, seat ring 19 has an inner diameter 33 that is 3.0625" and an outer diameter of outer diameter surface 31 of 4.50", making the distance between them equal to about 1.44". The radial depth or length of flange 45 from groove base 43c to the free edge of flange 45 is approximately 0.125", thus in this example the length of flange 45 is about 8.6% of the distance between inner diameter 33 and outer diameter surface 31. Preferably, the length of flange 45 is not greater than about 0.250", regardless of the diameters of surfaces 31 and 33. Flange 45 has a thickness measured at groove base 43c that is about 0.05". Groove forward side 43b inclines at an angle of nine degrees relative to a plane perpendicular to axis 44. These dimensions may vary.

A similar groove 47 is formed on seat ring inner diameter 33 at the junction with face 37. Inner diameter groove 47 defines an inner diameter flange 49 located at the inner peripheral edge of face 37. Inner diameter flange 49 may have the same thickness at its base and the same radial depth as outer diameter flange 45. Inner diameter flange 49 has an inner diameter that is the same as inner diameter 33 in this embodiment.

During operation of the embodiment of FIGS. 1-3, when gate 21 is closed and under load due to pressure, it will exert a force against seat ring 19, pressing it tightly against the base of counterbore 29. The load passes from seat ring 19 to gate valve body 13. Outer diameter flange 45 and inner diameter flange 49 deflect slightly under load, reducing stress concentrations at the corners or peripheral surfaces of face 37. The deflection is essentially elastic and non permanent. The reduction of the stress concentration at the inner and outer peripheral edges of face 37 reduces the tendency of the interface between face 37 and gate 21 to gall or scratch when gate 21 moves against face 37 under load.

Figure 4:
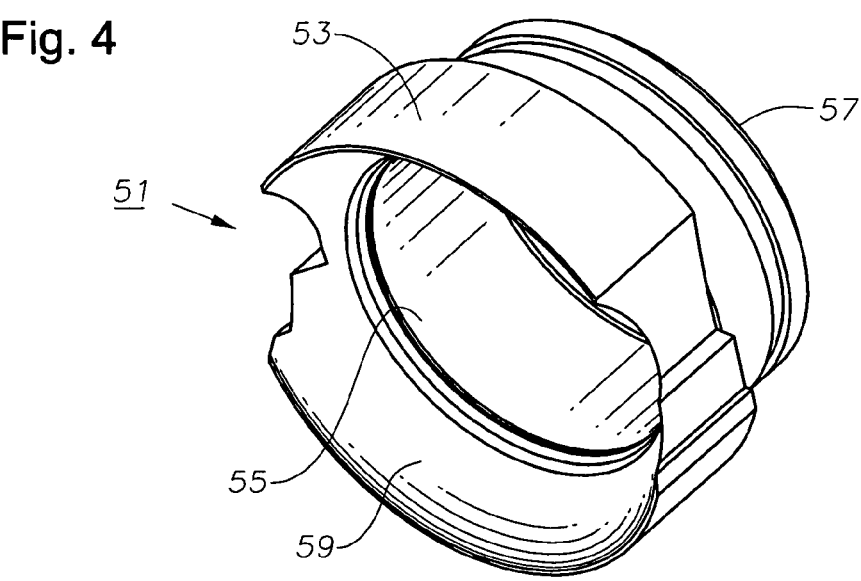
FIG. 4 is a perspective view of a ball valve seat constructed in accordance with this invention.
Figure 5:
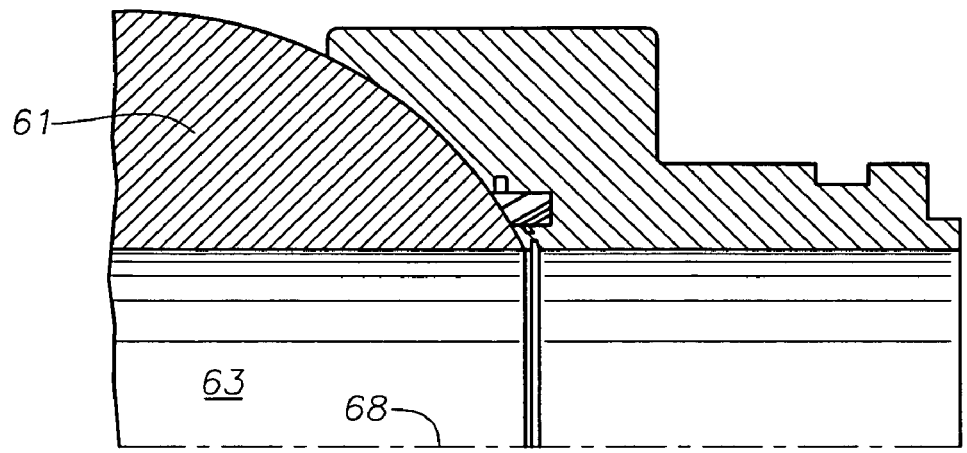
FIG. 5 is a sectional view of a portion of the seat of FIG. 4, shown with a portion of a ball element.
Figure 6:
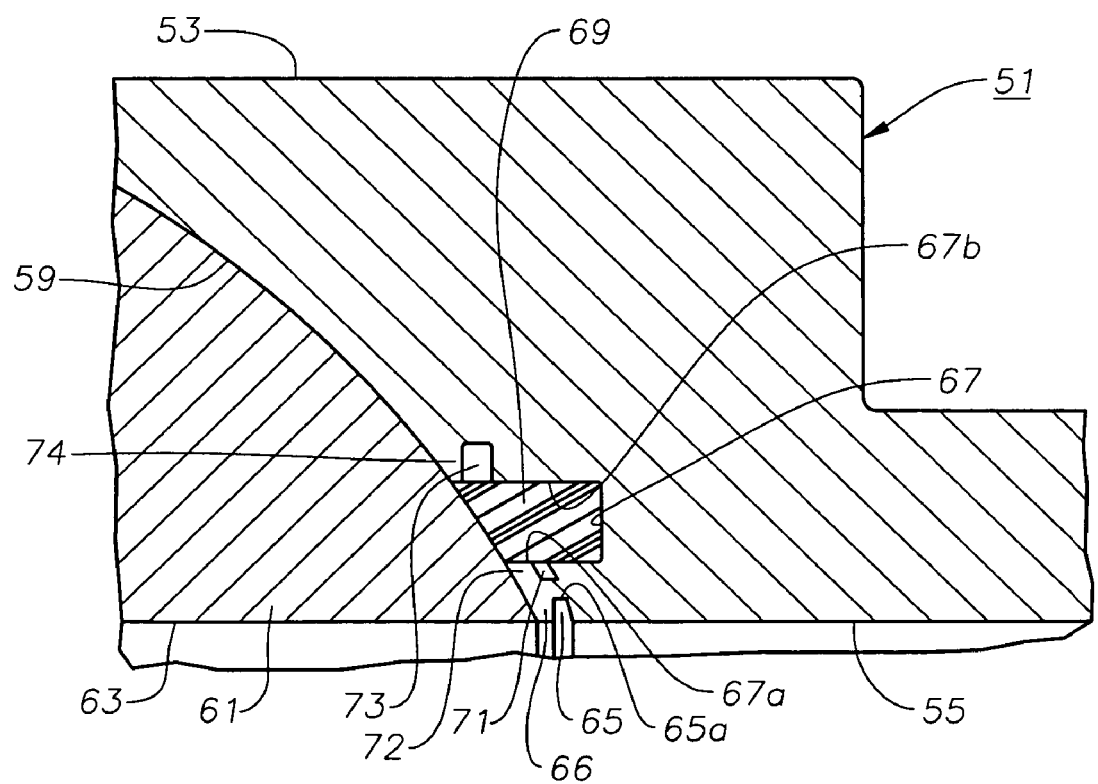
FIG. 6 is a further enlarged sectional view of a portion of the seat of FIG. 5.

The embodiment of FIGS. 4-6 comprises a ball valve seat 51. Ball valve seat 51 has an outer diameter surface 53 and an inner diameter surface 55. Inner diameter surface 55 registers with a passage in the ball valve body (not shown). Ball valve seat 51 has a rearward end 57 and a face 59 on a forward end. As shown particularly in FIGS. 5 and 6, face 59 is a portion of a sphere for mating with a spherical ball element 61.

Ball element 61 has a passage 63 that registers with seat inner surface 55 when open. When closed, ball valve passage 63 will be perpendicular to seat inner diameter 55. Ball element 61 thus slides against face 59 when moving between the open and closed positions. Under load, this movement can cause galling or other marring of the surface, particularly at the inner periphery of face 59 where it forms a corner with inner diameter 55.

Referring to FIG. 6, an inner diameter stress relief groove 65 is formed in inner diameter 55 near face 59. Inner diameter stress relief groove 65 defines a flange 66 having similar construction to flanges 45 and 49 of FIG. 3. Flange 66 has a thicker base than at its free edge or inner diameter because of the curvature of face 59. In this example, forward sidewall 65a of groove 65 is in a plane perpendicular to axis 68 (FIG. 5). The thickness of flange 66 at its base is approximately the same as its radial dimension measured along forward wall 65a. The actual dimensions of flange 66 may be similar to those of flanges 45 and 49 of FIG. 3.

Ball valve seat 51 in this embodiment has a seal cavity 67 in its face for containing a seal 69. Seal cavity 67 is annular and has an inner wall 67a and an outer wall 67b, both of which are concentric about axis 68 (FIG. 5). Inner wall 67a and outer wall 67b define edge portions of face 59. An inner wall stress relief groove 71 joins wall 67a and extends toward axis 68 (FIG. 5) but at angle that results in a flange 72 that is approximately the same dimensions as flange 66.

Similarly, an outer wall stress relief groove 73 joins outer wall 67b and extends in a radial outward direction. Outer wall stress relief groove 73 defines a flange 74. Flange 74 in this embodiment is larger in radial length and thickness than flange 72, although this could vary. Both flanges 72 and 74 taper in thickness from their bases to their free edges. Both flanges 72 and 74 define portions of face 59.

In the operation of the embodiment of FIGS. 4-6, when ball element 61 is closed and under fluid pressure, it exerts a high contact force against ball valve seat 51. This stress causes flanges 66, 72 and 74 to flex slightly, which reduces the contact stresses at the edge portions of face 59. As ball 61 moves to a closed position, a reduction in stress at these points reduces the tendency to gall or mar the surface finish of ball 61 and seat 51.

The invention has significant advantages. The small stress relief flanges formed in edge portions of the seat faces reduce stress concentrations that otherwise might result in galling of the surface finish. Reducing the edge bearing stress minimizes the failure mechanisms associated with materials under high load. These failure mechanisms include yielding, brinelling, adhesion, abrasion, fretting scratching and in general, marring of the mating seal surfaces. It is a further advantage that the reduced bearing stress occurs at the edge transition from the planar mating surface to the edge radius, where damage is likely to initiate due to the often irregular or discontinuous surface geometry at this location.

A reduction in bearing stress also tends toward reduced friction, thereby minimizing the torques and work to operate the valve. The reduction in peak bearing stress at the edges minimizes the likelihood of surface material failure and allows for a higher average bearing stress. As a result, valves can be made to survive for many more cycles, withstand more severe environments, or be smaller in size. All of these benefits result in more cost effective valve designs and help enable the practical design of extreme pressure valves.

While the invention has been shown in only two of its forms, it should be apparent to those skilled in the art that it is not so limited but is susceptible to various changes without departing from the scope of the invention.

I claim:

1. A valve seat, comprising:
a tubular member having an outer diameter surface for mounting in a valve body, a rearward end, a flat face on a forward end for sliding contact with a valve element, and a passage having an axis and extending from the rearward end to the face;
the face having concentric inner and outer diameter edge portions;
an outer flange extending radially outward from the tubular member for relieving bearing stress, the outer flange having a forward side that defines the outer diameter edge portion of the face, the outer flange having a rearward side facing in a rearward direction, the outer flange having a base where the outer flange joins the tubular member and a free outer edge that defines an outer diameter of the face; and
an inner flange extending radially inward from the tubular member for relieving bearing stress, the inner flange having a forward side that is located in a common plane with the outer flange and which defines the inner diameter edge portion of the face, the inner flange having a rearward side facing in a rearward direction, the inner flange having a base where the inner flange joins the tubular member and a free inner edge that defines an inner diameter of the face.

2. The valve seat according to claim 1, wherein the rearward side of each of the flanges is inclined relative to the axis.

3. The valve seat according to claim 1, wherein a thickness of each of the flanges between its forward and rearward sides decreases from its base to its free edge.

4. The valve seat according to claim 1, wherein the outer diameter of the face is less than the outer diameter surface of the valve seat.

5. The valve seat according to claim 1, wherein a radial dimension of each of the flanges is greater than the thickness of each of the flanges at its free edge.

6. The valve seat according to claim 1, wherein a radial dimension of each of the flanges from the base to the free edge is greater than the thickness of each of the flanges at its base.

7. The valve seat according to claim 1, wherein a portion of the outer flange is separated from the tubular member by an outer annular recess, and a portion of the inner flange is separated from the tubular member by an inner annular recess.

8. The valve seat according to claim 1, wherein a distance between the bases of the flanges is greater than a radial dimension of each of the flanges from its base to its free edge.

9. A valve seat, comprising:
a tubular member for mounting in a valve body, the tubular member having a rearward end, a face on a forward end for sliding contact with a valve element, and an inner diameter surface defining a passage having an axis and extending from the rearward end to the face;
the face having concentric first and second edge portions;
an annular first recess formed in the tubular member near the forward end of the tubular member, defining a first flange at the first edge portion of the face for relieving stress, the first flange having a forward side that defines part of the face, the first flange having a rearward side facing in a rearward direction and forming part of the first recess, the first flange having a base where it joins the tubular member and a free edge at the first edge portion of the face; and
an annular second recess formed in the inner diameter surface of the tubular member near the forward end of the tubular member, defining a second flange at the second edge portion of the face for relieving stress, the second flange having a forward side that defines part of the face, the second flange having a rearward side facing in a rearward direction and forming part of the second recess, the second flange having a base where it joins the tubular member and a free edge that defines an inner diameter of the face.

10. The valve seat according to claim 9, wherein the first edge portion is at an outer periphery of the face.

11. The valve seat according to claim 10, wherein has an outer diameter of the face is less than an outer diameter surface of the tubular member.

12. The valve seat according to claim 9, wherein the face is a portion of a sphere and wherein the valve seat further comprises:
an annular seal groove formed concentrically in the face; and wherein
the second edge portion comprises a junction of the face with the annular seal groove.

13. A valve seat, comprising:
a tubular member having a rearward end, a face on a forward end, the face being a portion of a sphere for sliding contact with a spherical valve element, and a passage having an axis and extending from the rearward end to the face;
an annular seal groove formed concentrically in the face, the seal groove having first and second side walls;
the face having a first edge portion joining the passage and a second edge portion joining the first side wall of the seal groove;
an annular first recess formed in the passage near the face, defining a first flange at the first edge portion of the face for relieving stress, the first flange having a forward side that forms part of the face, the first flange having a rearward side facing in a rearward direction and which forms part of the first recess, the first flange having a base and a free edge; and
an annular second recess formed in the first side wall of the seal groove near the face, defining a second flange at the second edge portion of the face for relieving stress, the second flange having a forward side that forms part of the face, the second flange having a rearward side facing in a rearward direction and which forms part of the second recess, the second flange having a base and a free edge.

14. The valve seat according to claim 13, wherein the face has a third edge portion joining the second side wall of the seal groove opposite the second edge portion, and wherein the valve seat further comprises:
a third flange formed at the third edge portion of the face for relieving stress, the third flange having a forward side that defines the third edge portion of the face, the third flange having a rearward side facing in a rearward direction, the third flange having a base and a free edge.

15. The valve seat according to claim 13, wherein:
a thickness of the first flange between its forward and rearward sides decreases from its base to its free edge; and
a thickness of the second flange between its forward and rearward sides decreases from its base to its free edge.

* * * * *

UNITED STATES PATENT AND TRADEMARK OFFICE
CERTIFICATE OF CORRECTION

PATENT NO. : 7,325,783 B2  
APPLICATION NO. : 11/120070  
DATED : February 5, 2008  
INVENTOR(S) : Hunter Page 1 of 1

It is certified that error appears in the above-identified patent and that said Letters Patent is hereby corrected as shown below:

<u>Column 1, line 59:</u> delete "flex. Thereby" and insert --Flex, thereby--

<u>Column 6, line 16:</u> after "wherein" delete "has" before "an"

Signed and Sealed this

Fifteenth Day of July, 2008

JON W. DUDAS  
*Director of the United States Patent and Trademark Office*